(12) United States Patent
Panwar et al.

(10) Patent No.: US 7,877,549 B1
(45) Date of Patent: Jan. 25, 2011

(54) ENFORCEMENT OF CACHE COHERENCY POLICIES USING PROCESS SYNCHRONIZATION SERVICES

(75) Inventors: Ramesh Panwar, Pleasanton, CA (US); Philip A. Thomas, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 825 days.

(21) Appl. No.: 11/811,700

(22) Filed: Jun. 12, 2007

(51) Int. Cl.
*G06F 12/14* (2006.01)
*G06F 13/16* (2006.01)

(52) U.S. Cl. .................. 711/141; 710/200; 711/152; 713/375

(58) Field of Classification Search .................. None
See application file for complete search history.

(56) References Cited

U.S. PATENT DOCUMENTS 6,049,866 A * 4/2000 Earl ........................ 712/227
6,745,294 B1 * 6/2004 Wilson et al. ............ 711/135
6,950,913 B2 * 9/2005 Glasco .................... 711/152
7,103,631 B1 * 9/2006 van der Veen ........... 709/205
7,194,587 B2 * 3/2007 McCalpin et al. ........ 711/144

OTHER PUBLICATIONS

Kuo et al., "MP-LOCKs: Replacing H/W Synchronization Primitives with Message Passing", High-Performance Computer Architecture, Jan. 1999 (article—5 pages).*
Kuo et al., "MP-LOCKs: Replacing H/W Synchronization Primitives with Message Passing", High-Performance Computer Architecture, Jan. 1999 (citation—1 page).*

* cited by examiner

*Primary Examiner*—Gary J Portka
(74) *Attorney, Agent, or Firm*—Shumaker & Sieffert, P.A.

(57) ABSTRACT

In general, this disclosure describes techniques of ensuring cache coherency in a multi-processor computing system. More specifically, a relaxed coherency mechanism is described that provides the appearance of strong coherency and consistency to correctly written software executing on the multi-processor system. The techniques, as described herein, combine software synchronization instructions with certain hardware-implemented instructions to ensure cache coherency.

37 Claims, 8 Drawing Sheets

ENFORCEMENT OF CACHE COHERENCY POLICIES USING PROCESS SYNCHRONIZATION SERVICES

TECHNICAL FIELD

The invention relates to computer memory caches, and particularly to memory cache coherency.

BACKGROUND

Multiple processors in a multiprocessor computing system may share a common memory. This common memory may store data and/or instructions utilized by the processors in the multiprocessor computing system. In order to improve access time to the common memory, the multiprocessor computing system may be designed such that caches are associated with each of the processors. These caches may store data and/or instructions retrieved from the common memory by individual ones of the processors and may store data to be written to the common memory by the processors.

Cache coherency issues may arise when one or more of the caches store its own copy of data associated with a memory location in the common memory. For example, a first processor in the multiprocessor system may be associated with a first cache and a second processor in the multiprocessor system may be associated with a second cache. The first cache may store a copy of data at memory address 0x66 of the common memory and the second cache may also store a copy of data at memory address 0x66 of the common memory. In this example, a cache coherency issue may arise when the first processor writes new data to memory address 0x66. When the first processor writes new data to memory address 0x66, the copy of the data at memory address 0x66 that is stored in the second cache is now obsolete. In other words, the first cache and the second cache are no longer coherent with respect to memory address 0x66. If the second processor were to use this obsolete copy of the data, the second processor may perform an incorrect behavior.

Typical multiprocessor computing systems include hardware to prevent cache coherency issues. For example, multiprocessor computing systems may implement a directory-based cache coherence mechanism. In a directory-based cache coherence mechanism, a multiprocessor computing system maintains a directory that specifies which caches contain which data. Cache controllers reference the directory when updating data within a cache to ensure the update is made within the other caches. In another example, multiprocessor computing systems may implement a snooping cache coherence mechanism. In a snooping cache coherence mechanism, a centralized hardware component, or each cache, monitors address lines to detect accesses to common memory locations. When a given cache detects a write request to a memory address that the cache has currently cached, the cache may invalidate a cache block in the cache associated with the memory address.

Implementations of directory-based and snooping cache coherence mechanisms may require significant amounts of hardware. As a result, multiprocessor computing systems that implement either of these cache coherence mechanisms may consume significant amounts of additional electrical power and/or may be physically larger.

SUMMARY

In general, this disclosure describes techniques of ensuring cache coherency in a multi-processor computing system. More specifically, a relaxed coherency mechanism is described that provides the appearance of strong coherency and consistency to correctly written software executing on the multi-processor system. The techniques, as described herein, combine software synchronization instructions with certain hardware-implemented instructions to ensure cache coherency.

The techniques take advantage of operating system-level process synchronization calls typically found within software applications executing on the multi-processor system in order to serialize access to shared memory. These process synchronization calls indicate when changes to shared memory become visible to the other software applications. In accordance with the techniques described herein, process synchronization services implementing the process synchronization calls have been modified to include cache coherence instructions supported by the processors. That is, the processors support an enhanced instruction set that has been extended to include additional hardware support for cache coherence instructions. In response to process synchronization calls from software applications, the process synchronization services may perform process synchronization operations and additionally invoke cache coherence instructions.

In one embodiment, a method comprises executing a first software process on a first processor in a multi-processor computing system. The first software process comprises a sequence of instructions that includes a process synchronization kernel call instruction. The method also comprises executing a first operating system (OS) instance on the first processor. In addition, the method comprises executing a process synchronization kernel service of the first OS instance with respect to a resource associated with one or more memory locations of a shared memory when the first processor executes the process synchronization kernel call instruction. The process synchronization kernel service comprises a sequence of instructions that includes a cache coherence instruction. The shared memory is shared among the first processor and at least one other processor in the multi-processor computing system. The method also comprises executing, with the first processor, the cache coherence instruction that is included in the sequence of instructions of the process synchronization kernel service. When the first processor executes the cache coherence instruction, the first processor outputs signals that enforce cache coherence among caches associated with processors in the multi-processor computing system with respect to the one or more memory locations associated with the resource.

In another embodiment, a multi-processor computing system comprises a first processor that executes a first OS instance and that executes a first software process. In addition, the multi-processor computing system comprises a second processor that executes a second OS instance. The multi-processor computing system also comprises a shared memory having memory locations that store data. The shared memory is utilized by the first processor and the second processor. In addition, the multi-processor computing system comprises a first cache that stores data that the first processor has read from the memory and data that the first processor has written to the shared memory. Furthermore, the multi-processor computing system comprises a second cache that stores data that the second processor has read from the memory and data that the second processor has written to the shared memory. The first processor includes hardware to execute cache coherence instructions. When the first processor executes a process synchronization kernel call instruction in the first software process, the first processor executes instructions of a process synchronization kernel service of the first OS instance with respect to a resource associated with one or more memory locations of the shared memory. When the first processor executes a cache coherence instruction in the process synchronization kernel service, the first processor outputs signals that enforce cache coherence among the first cache and the second cache with respect to the one or more memory locations associated with the resource.

In another embodiment, a computer-readable medium comprises instructions. When executed, the instructions cause a first processor in a multi-processor computing system to execute instructions of a first software process on a first processor in a multi-processor computing system. The first software process comprises a sequence of instructions that includes a process synchronization kernel call instruction. The instructions also cause the first processor to execute a first OS instance on the first processor. In addition, the instructions cause the first processor to execute a process synchronization kernel service of the first OS instance with respect to a resource that is associated with one or more memory locations of a shared memory when the first processor executes the process synchronization kernel call instruction. The process synchronization kernel service comprises a sequence of instructions that includes a cache coherence instruction. The shared memory is shared among the first processor and at least one other processor in the multi-processor computing system. The instructions also cause the first processor to execute the cache coherence instruction that is included in the sequence of instructions of the process synchronization kernel service. When the first processor executes the cache coherence instruction, the first processor outputs signals that enforce cache coherence among caches associated with processors in the multi-processor computing system with respect to the memory locations associated with the resource.

The techniques described in this disclosure may provide one or more advantages. For example, the techniques may provide similar programmability and portability benefits as strong cache coherence in other multiprocessor systems. However, a system implementing these techniques may require fewer hardware resources than traditional multi-processor systems using hardware-based techniques to ensure strong cache coherency. Furthermore, these techniques do not require any additional instructions within user processes.

The details of one or more examples are set forth in the accompanying drawings and the description below. Other features, objects, and advantages of the invention will be apparent from the description and drawings, and from the claims.

DETAILED DESCRIPTION

Figure 1:
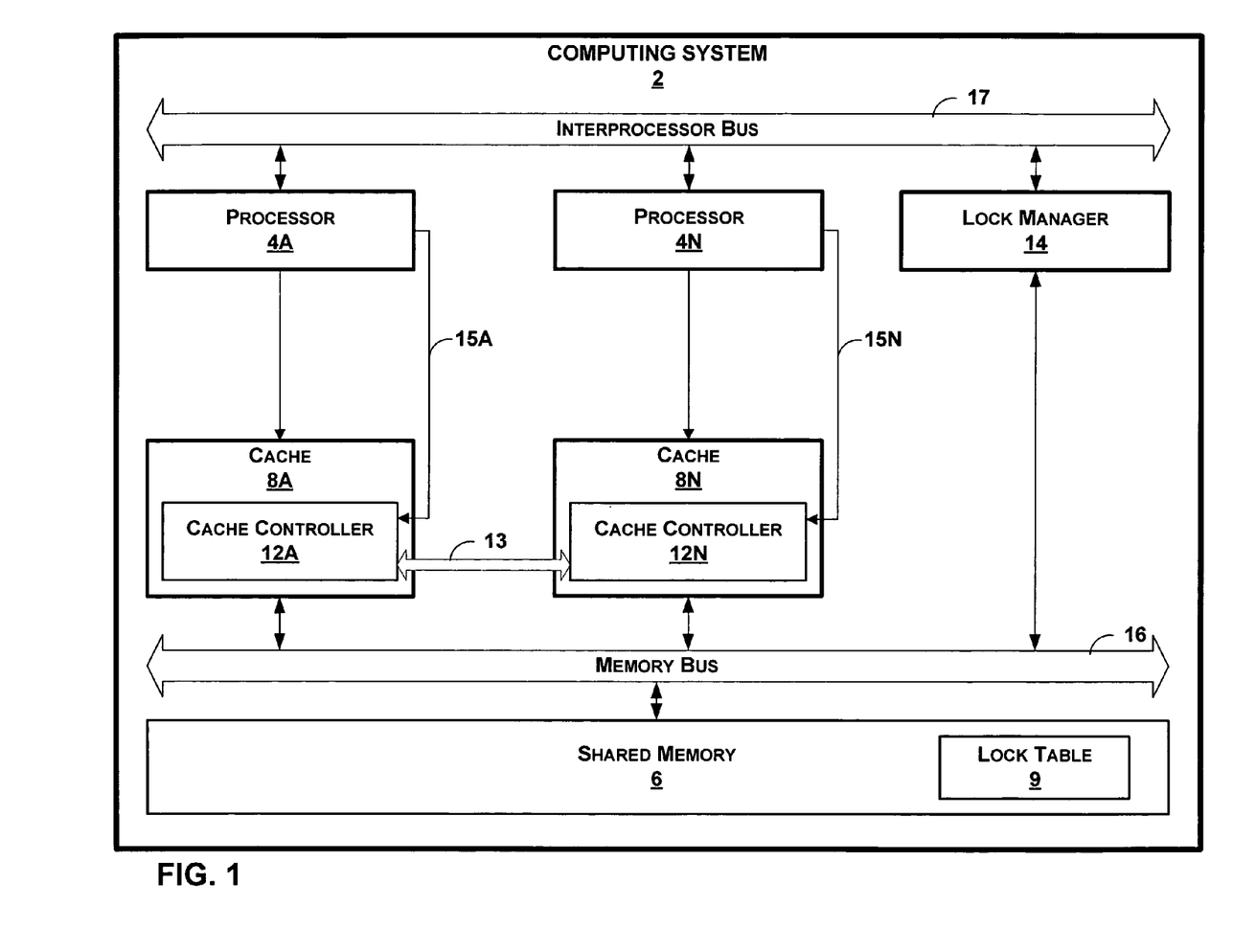
FIG. 1 is a block diagram illustrating an exemplary multi-processor computing system.

FIG. 1 is a block diagram illustrating an exemplary multi-processor computing system 2. Several concepts are needed to describe a release cache coherent multiprocessor computing system. These concepts include the following:

Program: A u-program is a programmer-specified sequence of instructions that executes on a single processor. An m-program is the collection of u-programs that execute on the multiprocessor.

Program order: The program order, is a total order among the instructions of a u-program as specified by the next instruction relation in the u-program. Instructions from u-programs running on different processors are not comparable by program order.

Process: A "u-process" is the sequence of instructions executed from a u-program on a processor. An m-process is the collection of u-processes that result from the execution of the respective u-programs on the multiprocessor.

Execution order: The "execution order" is a total order among the instructions of a u-process based on instruction execution completion. Unlike program order, instructions from u-processes on different processors in the multiprocessor system may be comparable by execution order based on values observed in shared memory. Thus, while no instructions in an m-program are comparable by program order, some instructions in an m-process may be comparable by execution order.

Synchronization order: Synchronization operations op1 and op2 executed by processors $P_i$ and $P_j$ are in synchronization order in an m-process, if op1 completes before op2 in the m-process.

Happens-before order: A "happens-before" order for a multi-processor computing system is a partial order defined for the execution of a set of processes through an irreflexive transitive closure of the program order for the set of programs and the "synchronization order" for the set of processes.

Data race: Two operations by processors $P_i$ and $P_j$ in a multi-processor computing system constitute a "data race" in an execution of a set of processes when both of the operations are write operations to the same memory location and the operations are not ordered by "happens-before" order in the set of processes.

Using these concepts, a multi-processor computing system is defined herein as "release coherent" if and only if:

(a) every write operation issued by a processor in the multi-processor computing system eventually completes with respect to all processors in the computing system if followed in program order by a release operation, (b) a read operation by a processor $P_i$ in the computing system returns a value of the last write to the same location issued by $P_i$ that has not yet completed with respect to $P_i$ or, if there is no such write by $P_i$ then it returns the initial value of the memory location, and (c) write operations to the same memory location complete in the same order with respect to every processor if the writes are not involved in a data race.

Computing system 2, illustrated in the example of FIG. 1, may comprise a network server, an intermediate network device, a personal computer, a laptop computer, a video game platform or console, a graphics processing unit, a network appliance, a supercomputer, a computer integrated into a vehicle, a robotic device, a mobile radiotelephone, a point-of-sale device, a mainframe computer, or another type of computing system.

Computing system 2 may include processors 4A through 4N (collectively, "processors 4"). Processors 4 may comprise general-purpose microprocessors, application-specific integrated circuits, digital signal processors, or other types of integrated circuits. For example, processors 4 may comprise Core processors manufactured by Intel Corp. of Santa Clara, Calif. An inter-processor bus 17 may facilitate communication among processors 4 and a lock manager 14.

Furthermore, computing system 2 may include a shared memory 6. Shared memory 6 may comprise a Synchronous Dynamic Random Access Memory, a Direct Rambus Dynamic Random Access Memory, a Double Data Rate 2 or 3 Synchronous Random Access Memory, or another type of random access memory.

Each of processors 4 may be associated with one or more of caches 8A through 8N (collectively, "caches 8"). As illustrated in the example of FIG. 1, processor 4A may be associated with cache 8A, processor 4B may be associated with cache 8B, and so on.

Caches 8 may comprise storage units that cache data that processors 4 read from or write to a shared memory 6. In other words, caches 8 store copies of data read from and written to shared memory 6. In some circumstances, caches 8 may store copies of all data in shared memory 6. A memory bus 16 facilitates communication between caches 8 and shared memory 6.

Each of caches 8 may represent an individual cache block. A cache block may be subdivided into a plurality of cache zones. Each cache zone may be subdivided into a plurality of cache sectors. A cache sector may store data associated with several contiguous memory locations. For example, each cache sector may store sixteen bytes. Moreover, each cache sector may be aligned on a 16 byte boundary. If a cache sector associated with a memory location stores data that is different than data stored at the memory location in shared memory 6, this disclosure may refer to this cache sector as "dirty." Likewise, if a cache sector associated with a memory location stores data that is not different than data stored at the memory location in shared memory 6, this disclosure may refer to this cache sector as "clean." Each cache sector in caches 8 may be associated with a status bit that indicates whether a particular cache sector is "dirty" or "clean."

Furthermore, caches 8A through 8N may include cache controllers 12A through 12N (collectively, "cache controllers 12"). Each of cache controllers 12 may comprise one or more integrated circuits that control the operations of one of caches 8 in response to signals from processors 4 and other ones of cache controllers 12. An inter-cache bus 13 facilitates communication among cache controllers 12.

Each of processors 4 executes software instructions of computer programs. For example, processors 4 may execute instructions of an operating system, execute instructions of an end-user software application, or execute instructions of another type of computer program. Because processors 4 use shared memory 6, data corruption in shared memory 6 may occur if programs executed by processors 4 are not properly synchronized. For example, if programs executed by processors 4 are not properly synchronized, a first program may cause processor 4A to read data from a memory location in shared memory 6 while a second program may cause processor 4B to attempt to write data to the same memory location in shared memory 6. As a result, processor 4A may receive some of the old data in the memory location and some of the data that processor 4B is writing to the memory location. Because the data received by processor 4A is neither the old data nor the new data, processor 4A may perform in unexpected ways.

To avoid synchronization problems, such as that described in the previous paragraph, processes may include process synchronization kernel call instructions. When one of processors 4 executes a process synchronization kernel call instruction in a process, the operating system suspends the process and performs a process synchronization kernel service provided by that instance of the operating system executing on the processor. A process synchronization kernel service may comprise a sequence of instructions that cause a processor to perform a process synchronization operation. For example, a first process may include a process synchronization kernel call instruction. When processor 4A executes the process synchronization kernel call instruction, processor 4A may suspend the first process and begin executing instructions of a process synchronization kernel service.

The instructions of process synchronization kernel services may include instructions that cause processors 4 to use inter-processor bus 17 to send one or more messages to lock manager 14. These messages may instruct lock manager 14 to acquire or to release a lock on one or more resources. A resource may be a data structure stored in one or more memory locations. For example, a resource may be an array of thirty integers. A name of a resource (i.e., a resource name) is an identifier that used by processes to identify a shared resource. For example, a process executing on processor 4A and a process executing on processor 4B may use the name "integerArray30" to refer to the resource in the previous example.

Lock manager 14 may comprise an integrated circuit such as a microprocessor, an application-specific integrated circuit, a digital signal processor, or another type of integrated circuit. Lock manager 14 may maintain a lock table 9 in shared memory 6. Lock table 9 may specify whether resources are locked. For example, lock table 9 may specify that a process has acquired a lock on resource "integerArray30".

The instructions of process synchronization kernel services may also include cache coherence instructions. When processors 4 execute cache coherence instructions, the cache coherence instructions cause the processors to output respective ones of signals 15A through 15N (collectively, "signals 15") that enforce cache coherence among caches 8. As explained in detail below, cache coherence instructions may cause processors 4 to output signals 15 to cache controllers 12. When one of cache controllers 12 receives one of signals 15, the cache controller may copy updated data from the cache to shared memory 6 and may output signals via inter-cache bus 13 that instruct the other cache controllers to invalidate cache sectors associated with the updated data.

The techniques described in this disclosure may provide one or more advantages. For example, the techniques may provide a simple mechanism to enforce the release coherency of caches 8. Moreover, because the techniques rely on software applications to invoke process synchronization kernel services that, when executed, invoke cache coherence instructions, there may be no need to track in hardware whether to invalidate sectors of caches 8. This may contribute to a simpler hardware design that saves energy, production costs, and development costs. Furthermore, because process synchronization kernel services may include the cache coherence instructions, there may be no need for a process that uses the process synchronization kernel services to include cache coherence instructions. In other words, execution of the cache coherence instructions is transparent to a process that includes a process synchronization kernel call instruction. Because the execution of the cache coherence instructions is transparent to the process, the process does not need to include the cache coherence instructions in order to enforce release coherency.

Figure 2:
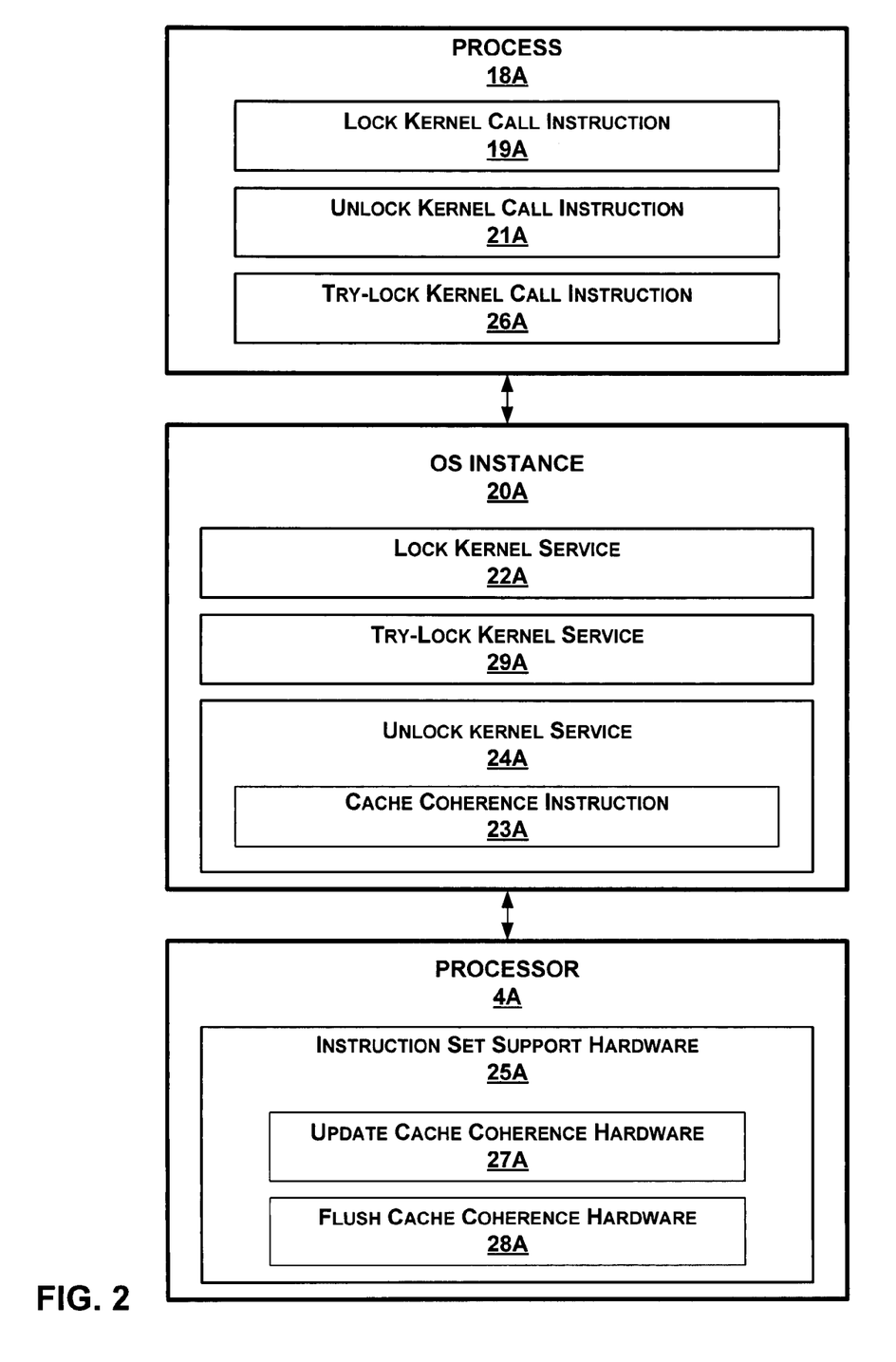
FIG. 2 is a block diagram illustrating an exemplary software stack.

FIG. 2 is a block diagram illustrating an exemplary software stack. As illustrated in the example of FIG. 2, a process 18A operates within an operating environment provided by an operating system (OS) instance 20A. OS instance 20A operates within an operating environment provided by processor 4A (FIG. 1). In other words, process 18A may utilize services provided by OS instance 20A and processor 4A. OS instance 20A may utilize services provided by processor 4A.

OS instance 20A may comprise a sequence of instructions that, when executed by processor 4A, cause processor 4A to provide a distributed real-time operating system. Process 18A may comprise a sequence of instructions that, when executed by processor 4A, cause processor 4A to perform a software application. Process 18A may represent a process of a multi-process software application (i.e., a u-process of an m-process). Such a multi-process software application may cause processors 4 to perform a wide variety of computing tasks. For instance, the multi-process software application may detect network attacks in network traffic that flows to computing system 2. A network attack may comprise a computer virus, spyware, an attempt to gain unauthorized access to information, or another type of security threat that is embodied in network traffic. Alternatively, process 18A may not cause processor 4A to interact with instances of a same computer program executing on other ones of processors 4.

Processor 4A includes instruction set support hardware 25A to execute various software instructions. For example, instruction set support hardware 25A may include circuitry to execute arithmetic instructions (e.g., add, multiply, divide, subtract, etc.) and logical instructions (e.g., and, or, not, exclusive or, etc.). Furthermore, instruction set support hardware 25A may include hardware to execute cache coherence instructions. As illustrated in the example of FIG. 2, instruction set support hardware 25A includes update cache coherence hardware 27A to execute "update" cache coherence instructions and flush cache coherence hardware 28A to execute "flush" cache coherence instructions.

Process 18A includes a lock kernel call instruction 19A that specifies a name of a resource. When processor 4A executes lock kernel call instruction 19A, instructions of OS instance 20A may suspend process 18A and cause processor 4A to execute the instructions of lock kernel service 22A provided by OS instance 20A. The instructions of lock kernel service 22A may cause processor 4A to determine whether there is already a lock on the resource specified by the process synchronization kernel call. For example, the instructions of lock kernel service 22A may cause processor 4A to output one or more messages to lock manager 14 via inter-processor bus 17. These messages may include the resource name specified by lock kernel call instruction 19A. When lock manager 14 receives these messages, lock manager 14 may determine whether a process has acquired a lock on a resource indicated by the resource name. If a process has already acquired a lock on the resource indicated by the resource name, lock manager 14 may send a message to processor 4A instructing OS instance 20A to block process 18A (e.g., cause the process to sleep) until a lock on the specified resource has been released. If no process has acquired a lock on the resource indicated by resource name, lock manager 14 may update lock table 9 to indicate that a process has acquired a lock on the resource indicated by the resource name and allows process 18A to continue operating. Consequently, whenever another process requests a lock on this resource, this other process is blocked until process 18A releases the lock.

Process 18A may include a process synchronization kernel call instruction 26A for a so-called "try-lock" process synchronization kernel service provided by OS instance 20A. When processor 4A executes "try-lock" process synchronization kernel call instruction 26A that specifies a particular resource, instructions of OS instance 20A may cause processor 4A to suspend process 18A and to execute the instructions of a "try-lock" process synchronization kernel service 29. The instructions of "try-lock" process synchronization kernel service 29 may cause lock manager 14 to determine whether a process has already acquired a lock on the specified resource. If no process has acquired a lock on the specified resource, lock manager 14 may update lock table 9 to indicate that a process has acquired a lock on the specified resource. However, if lock manager 14 determines that another process has already acquired a lock on the specified resource, lock manager 14 does not cause process 18A to be blocked. Rather, process 18A may continue to operate. Thus, the "try-lock" synchronization kernel service may be used to implement a so-called "spin lock" in which the invoking process actively waits for the lock to be released. A "spin lock" may be useful when it is possible for a process to perform work while the process is waiting for a lock to become available.

While process 18A has a lock on a resource, the instructions of process 18A may cause processor 4A to initiate one or more read operations that read data from a memory location associated with the resource and to initiate one or more write operations that write data to a memory location associated with the resource. When the instructions of process 18A cause processor 4A to initiate a read operation, processor 4A may read the data from cache 8A before attempting to read the data from shared memory 6. When the instructions of process 18A cause processor 4A to initiate a write operation to write data to a memory location, the write operation does not write the data to the memory location in shared memory 6. Rather, when the instructions of process 18A cause processor 4A to initiate a write operation for the memory location, the write operation updates the data associated with the memory location in cache 8A.

The instructions of process 18A also include an unlock kernel call instruction 21A that specifies a resource name. When processor 4A executes unlock kernel call instruction 21A, instructions of OS instance 20A may cause processor 4A to suspend process 18A and to execute the instructions of an unlock kernel service 24A in OS instance 20A.

The instructions of unlock kernel service 24A include a cache coherence instruction 23A. Cache coherence instruction 23A may be an "update" cache coherence instruction or a "flush" cache coherence instruction. When processor 4A executes the either a "update" cache coherence instruction or a "flush" cache coherence instruction, update cache coherence hardware 27A or flush cache coherence hardware 28A of processor 4A may output signals 15A to cache controller 12A. Signals 15A enforce cache coherence among caches 8 with respect to the memory addresses specified as operands of the cache coherence instructions. The specified memory addresses may be the memory addresses associated with a resource indicated by the resource name specified by unlock kernel call instruction 21A.

Cache coherence instruction 23A may specify groups of memory addresses at various levels of cache granularity. For instance, cache coherence instruction 23A may specify memory addresses at the "cache sector" level of cache granularity, memory addresses at the "cache zone" level of granularity, or memory addresses at the "cache block" level of cache granularity. When processor 4A executes an update cache coherence instruction, update cache coherence hardware 27A may output signals that enforce cache coherence among caches 8 with respect to memory locations at the specified level of cache granularity.

When processor 4A executes an "update" cache coherence instruction that specifies a particular memory address at the "cache sector" level of cache granularity, update cache coherence hardware 27A may output signal 15A to cache controller 12A. When cache controller 12A receives signal 15A, cache controller 12A may identify a cache sector in cache 8A that is associated with the memory address. Next, cache controller 12A may determine whether a status indicator of the identified cache sector indicates that the identified cache sector is "dirty." If the status indicator of the identified cache sector indicates that the identified cache sector is "dirty," cache controller 12A may copy data in the identified cache sector to the memory location in shared memory 6. After cache controller 12A copies the data in the identified cache sector, cache controller 12A may update the status indicator of the identified cache sector to indicate that the identified cache sector is "clean." Next, cache controller 12A may send "invalidate" messages to cache controllers 12B through 12N via inter-cache bus 13. The "invalidate" messages may instruct cache controllers 12B through 12N to invalidate cache sectors in caches 8B through 8N that are associated with the memory address.

When processor 4A executes an "update" cache coherence instruction that specifies one or more cache zones, update cache coherence hardware 27A may output signal 15A to cache controller 12A. When cache controller 12A receives signal 15A, cache controller 12A may identify cache sectors in the specified cache zones that have status indicators that indicate that cache sectors are "dirty." After identifying the "dirty" cache sectors, cache controller 12A may copy data in the identified cache sectors to memory locations of shared memory 6 that are associated with the identified cache sectors. Next, cache controller 12A may send "invalidate" messages to cache controllers 12B through 12N via inter-cache bus 13. The "invalidate" messages may instruct cache controllers 12B through 12N to invalidate, in cache zones of caches 8B through 8N that are equivalent to the specified cache zones, cache sectors that are associated with memory locations that associated with the "dirty" sectors.

When processor 4A executes an "update" cache coherence instruction that specifies a cache block, update cache coherence hardware 27A may output one or more signals to cache controller 12A. When cache controller 12A receives the signals, cache controller 12A may first identify cache sectors in cache 8A that are "dirty." Cache controller 12A may then copy data in each of the identified cache sectors to memory locations of shared memory 6 that are associated with the identified cache sectors: After copying the data, cache controller 12A may send "invalidate" messages to cache controllers 12B through 12N via inter-cache bus 13. The "invalidate" messages may instruct cache controllers 12B through 12N to invalidate cache sectors of caches 8B through 8N that are associated with memory locations that are associated with the identified sectors of cache 8A.

When processor 4A executes a "flush" cache coherence instruction, flush cache coherence hardware 28A may output one or more signals to cache controller 12A. When cache controller 12A receives the signals, cache controller 12A may perform an operation that is similar to the operation that cache controller 12A performs when cache controller 12A receives signals from update cache coherence hardware 27A, as described in the preceding paragraphs. However, when cache controller 12A receives the signals from flush cache coherence hardware 28A, cache controller 12A may invalidate "dirty" cache sectors in all of caches 8. For example, when processor 4A executes a "flush" cache coherence instruction that specifies a particular cache sector, flush cache coherence hardware 28A may output signals 15A that cause cache controller 12A to copy data in the specified cache sector to shared memory 6 if the cache sector is "dirty." After copying the data to shared memory 6, cache controller 12A may invalidate the specified cache sector in cache 8A and broadcast "invalidate" messages to cache controller 12B through 12N in order to invalidate equivalent cache sectors in caches 8B through 8N. Like update cache coherence instructions, flush cache coherence instructions may be invoked with regard to cache blocks, cache sectors, cache zones, or other levels of granularity.

Data races may result when processes are written such that more than one resource may be stored in one cache sector. That is, in order to avoid data races, processes should be written such that no two resources may be stored within one cache sector. Two operations by two of processors 4 constitute a data race in an execution if the two operations are both write operations and the two operations are not ordered by a "happens-before" order in a set of processes that use a common memory location or cache sector.

To illustrate why processes should not be written such that more than one resource may be stored in one cache sector, consider the following example. A first process operating on processor 4A and a second process operating on processor 4B may cooperate to perform a computing task. The first process and the second process may use two resources: resource A and resource B. Resource A may be a data structure that stores data at memory addresses 4 and 20 in a byte addressable memory architecture (i.e., each addressable memory location stores a single byte). Resource B may be a data structure that stores data at memory addresses 28 and 36. As discussed above, each cache sector in caches 8 may store sixteen bytes. In this example, caches 8A and 8B may both include first cache sectors that store data associated with memory addresses 0-15, second cache sectors that store data associated with memory addresses 16-31, and third cache sectors may store data associated with memory addresses 32-47. Therefore, the data of resource A be stored in the first cache sectors and the second cache sectors and the data of resource B may be stored in the second cache sectors and the third cache sectors.

Continuing the example of the previous paragraph, the first process may acquire a lock on resource A and the second process may acquire a lock on resource B. The first process may acquire a lock on resource A and the second process may acquire a lock on resource B because lock manager 14 uses resource names, not cache sectors, to determine whether a process has already acquired a lock. Because the first process has acquired a lock on resource A, the first process may write data to memory address 20. When the first process writes data to memory address 20, the cache sector associated with memory addresses 16-31 in cache 8A is marked as "dirty." Furthermore, because the second process has acquired a lock on resource B, the second process may write data to memory address 28. When the second process writes data to memory address 28, the cache sector associated with memory addresses 16-31 in cache 8B is marked as "dirty."

After writing the data to memory address 20, the first process may invoke unlock kernel service 24A to release the lock on resource A. As described above, the instructions of unlock kernel service 24A may include an "update" cache coherence instruction or a "flush" cache coherence instruction. When processor 4A executes the "update" cache coherence instruction or the "flush" cache coherence instruction, update cache coherence hardware 27A or flush cache coherence hardware 28A may output signals 15A to cache controller 12A that instruct cache controller 12A to update or to flush cache sectors associated with memory addresses 0-15 and cache sectors associated with memory addresses 16-31. When cache controller 12A receives signals 15A, cache controller 12A may broadcast "invalidate" messages in order to invalidate cache sectors associated with memory addresses 0-15 and cache sectors associated with memory addresses 16-31. When cache controller 12B receives the message to invalidate cache sectors associated with memory addresses 16-31, cache controller 12B may detect that the cache sector of cache 8B associated with memory addresses 16-31 is "dirty." The fact that cache controller 12B received an "invalidate" message for cache sectors that are "dirty" indicates that a data race has occurred. If cache controller 12B were to invalidate the cache sector associated with memory addresses 16-31, the data written to memory address 28 would be lost and the second process would have no way of knowing that this data had been lost. This may cause the second process to function in an incorrect manner.

When any of cache controllers 12 detect a data race, the cache controller may output a signal to one of processors 4. In response to this signal, the processor may provide an alert to the user of computing system 2. The alert may help the user of computing system 2 to debug process 18A. In particular, the alert may help the user of computing system 2 to reprogram processes such that the processes do not share resources that may be stored within one cache sector.

Processes may directly include cache coherence instructions. For example, process 18A may be one thread of a single application. These threads may be programmed to be intentionally non-deterministic. In other words, the threads of the application may be intentionally asynchronous. Because the threads of the application are non-synchronous, the threads might not include process synchronization kernel calls. In this example, the threads may directly include cache coherence instructions in order to write data from caches 8 to shared memory 6.

Figure 3:
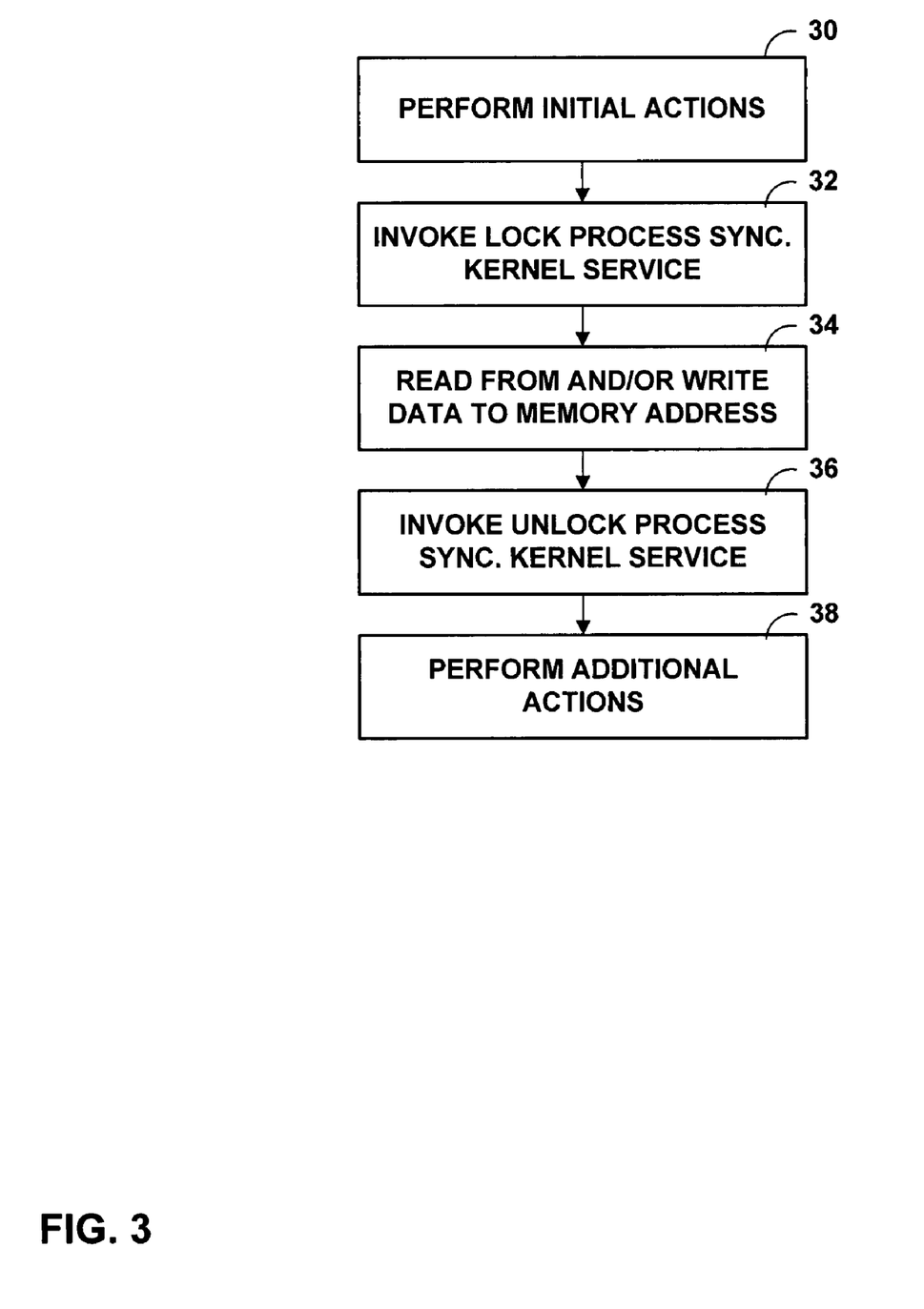
FIG. 3 is a flowchart that illustrates an example operation a process.

FIG. 3 is a flowchart that illustrates an example operation of process 18A. Initially, the instructions of process 18A may cause processor 4A to perform one or more actions (30). For example, process 18A may cause processor 4A to perform a pattern matching operation. Later, a "lock" process synchronization kernel call instruction of process 18A may cause processor 4A to perform the instructions of lock kernel service 22A (32). The "lock" process synchronization kernel call instruction may specify a resource name. The instructions of lock kernel service 22A cause processor 4A to output signals that cause cache controller 12A to acquire a lock on a resource indicated by the specified resource name.

After processor 4A executes "lock" process synchronization kernel call instruction 19A, the instructions of process 18A may cause processor 4A to initiate one or more read or write operations to memory addresses associated with the resource (34). Subsequently, "unlock" process synchronization kernel call instruction 21A of process 18A may cause processor 4A to perform the instructions of unlock kernel service 24A (36). From the perspective of process 18A, the instructions of unlock kernel service 24A cause lock manager 14 to release the lock on the specified resource. Additional instructions of process 18A may then cause processor 4A to perform one or more additional actions (38).

Figure 4:
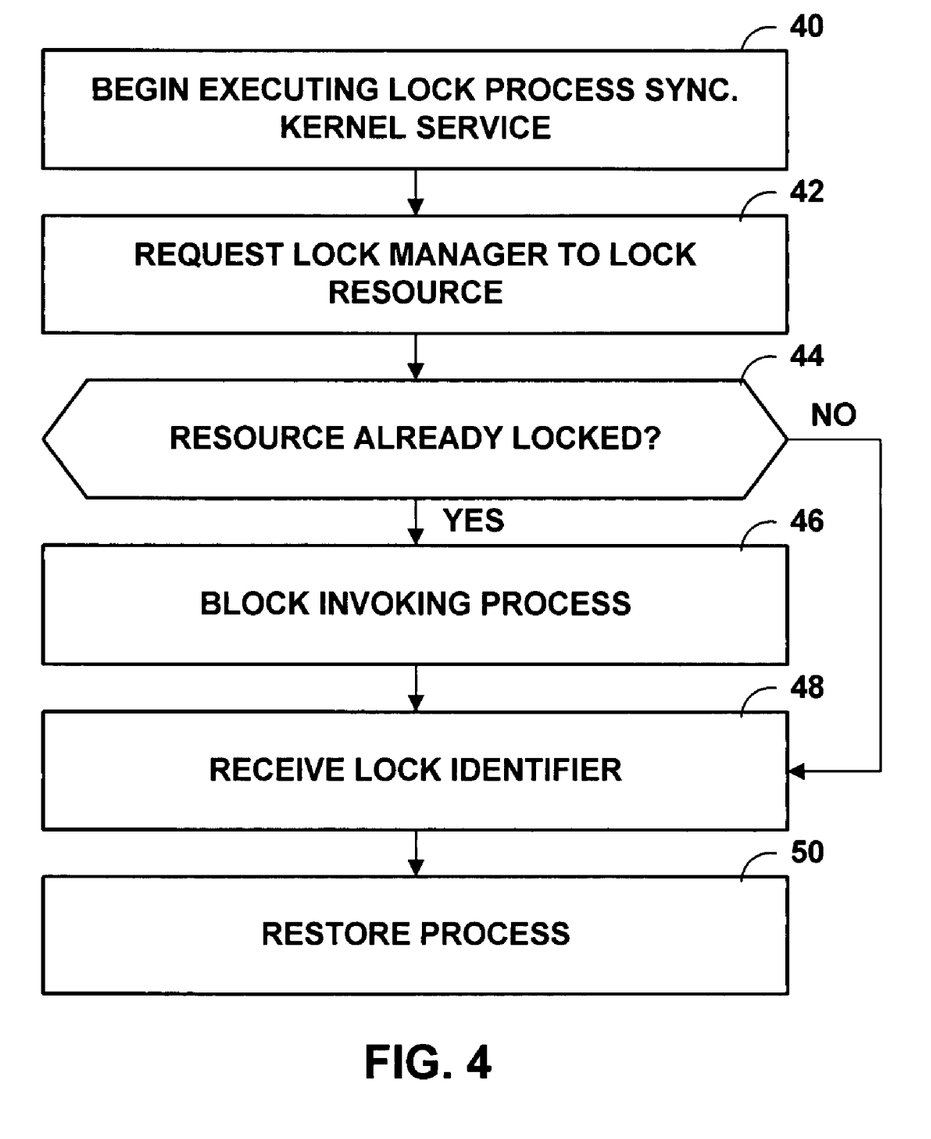
FIG. 4 is a flowchart illustrating an example operation of a lock kernel service.

FIG. 4 is a flowchart illustrating an example operation of lock kernel service 22A. Initially, lock kernel call instruction 19A in process 18A may cause processor 4A to execute instructions of lock kernel service 22A (40). The instructions of lock kernel service 22A cause processor 4A to output one or more messages to lock manager 14 requesting a lock on a resource (42).

If another process has already acquired a lock on the resource ("YES" of 44), lock manager 14 may output a message to processor 4A that causes instructions of OS instance 20A in processor 4A to block process 18A until processor 4A receives a signal from lock manager 14 that process 18 has acquired the lock on the resource (46). For instance, the instructions of OS instance 20A may add process 18A to a list of "suspended" processes. When a process is on the list of "suspended" processes, processor 4A does not process instructions of the process. When process 18A acquires the lock on the resource ("NO" of 44), processor 4A may receive a lock identifier of the lock from lock manager 14 (48). When processor 4A receives the lock identifier, the instructions of lock kernel call instruction 19A may unblock process 18A (50). For example, the instructions of lock kernel service 22A may cause processor 4A to remove the current process from the list of "suspended" processes and add the process to a list of "active" processes.

Figure 5:
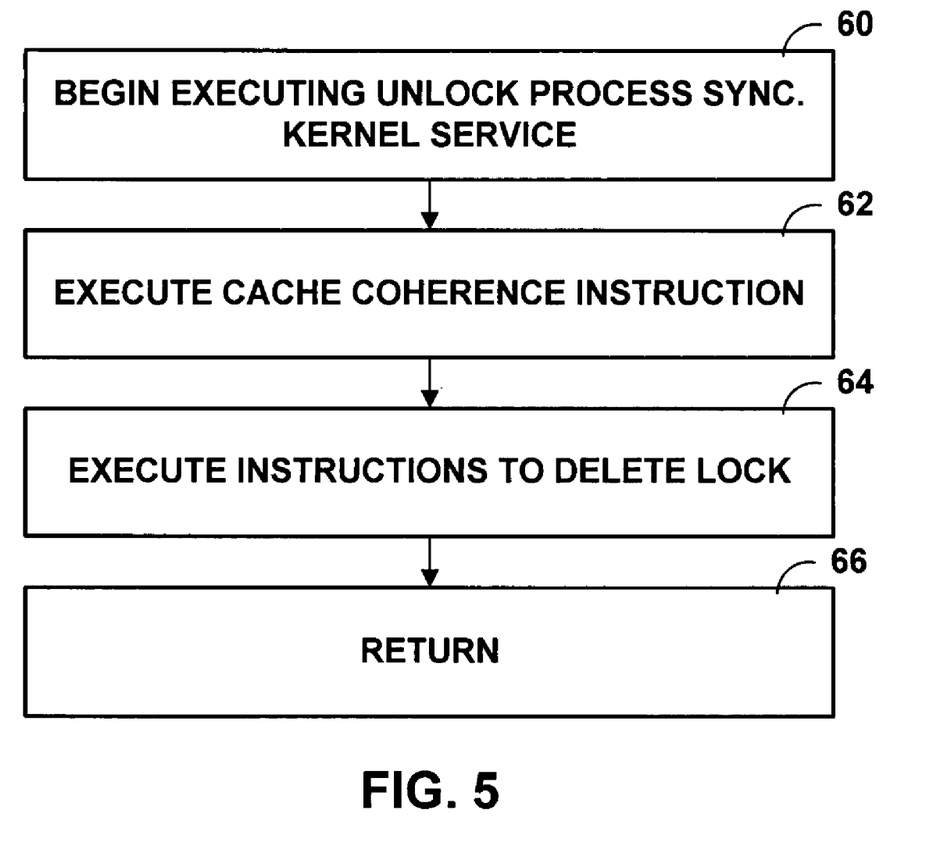
FIG. 5 is a flowchart illustrating an example operation of an unlock kernel service.

FIG. 5 is a flowchart illustrating an example operation of unlock kernel service 24A. Initially, unlock kernel call instruction 21A in process 18A may cause processor 4A to begin executing instructions of unlock kernel service 24A (60). Unlock kernel call instruction 21A may specify a resource name. When processor 4A is executing the instructions of unlock kernel service 24A, processor 4A may execute cache coherence instruction 23A in unlock kernel service 24A (62) When processor 4A executes cache coherence instruction 23A, cache coherence instruction 23A may cause processor 4A to output signals 15A that enforce cache coherence among caches 8. After processor 4A executes cache coherence instruction 23A, the instructions of unlock kernel service 24A may cause processor 4A to output a message to lock manager 14 to cause lock manager 14 to release the lock on the resource indicated by the specified resource name (64). After causing processor 4A to output this message, the instructions of unlock kernel service 24A may cause processor 4A to return control to process 18A (66).

Figure 6:
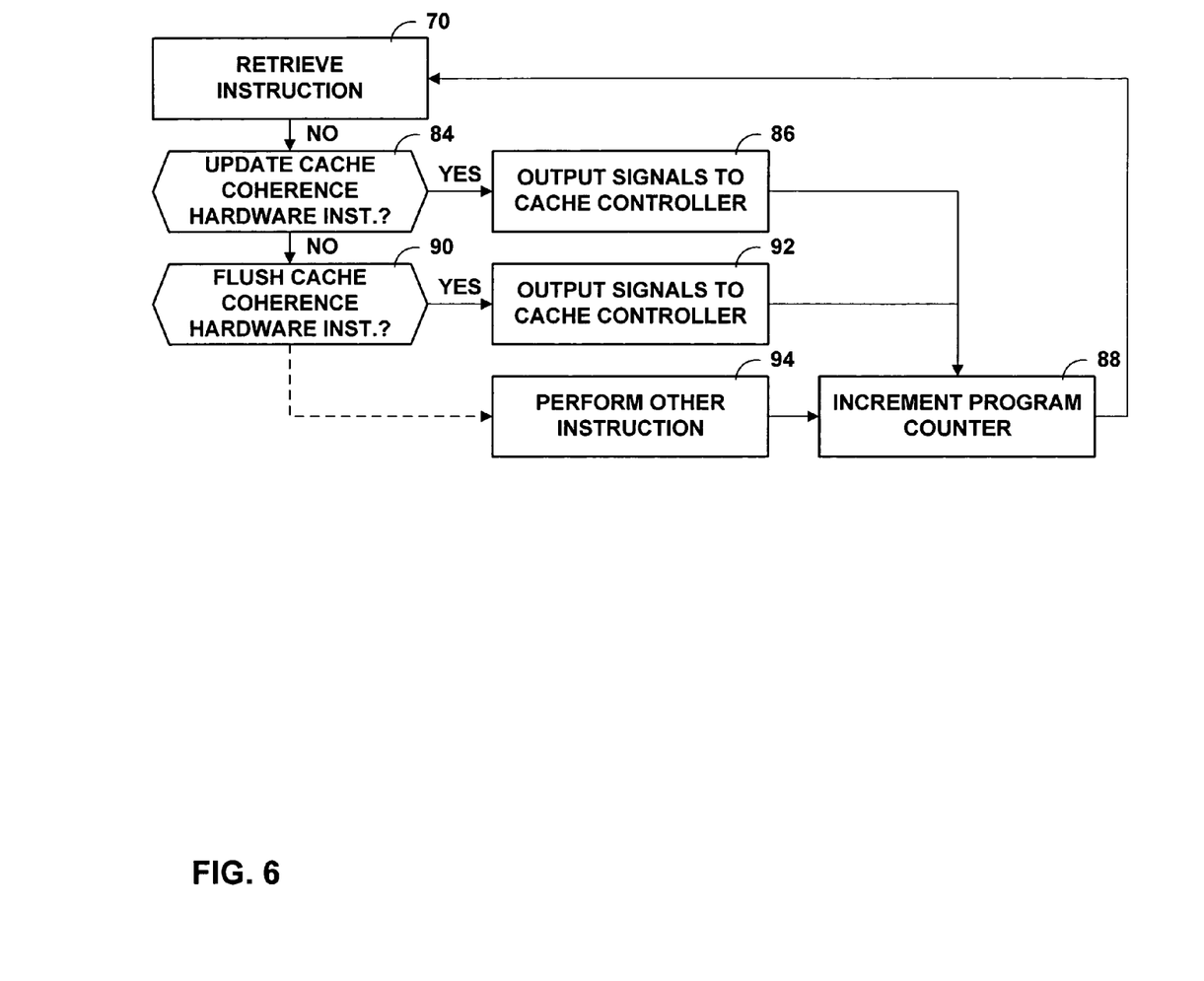
FIG. 6 is a flowchart illustrating an exemplary operation of a processor.

FIG. 6 is a flowchart illustrating an exemplary operation of processor 4A. Initially, processor 4A may retrieve a current instruction from a memory location indicated by a memory address stored in a program counter of processor 4A (70). The current instruction may be an instruction of a "current process."

When processor 4A retrieves the current instruction, processor 4A may determine whether the current instruction is an "update" cache coherence instruction (84). If the current instruction is an "update" cache coherence instruction ("YES" of 84), update cache coherence hardware 27A in processor 4A may output signals 15A to cache controller 12A (86). Signals 15A instruct cache controller 12A to perform an update cache coherence operation. After processor 4A outputs signals 15A to cache controller 12A, processor 4A may increment the program counter (88). Once processor 4A has incremented the program counter, processor 4A may loop back and retrieve the instruction from the memory location indicated by the memory address stored in the program counter of processor 4A (70).

If the current instruction is not an "update" cache coherence instruction ("NO" of 84), processor 4A may determine whether the current instruction is a "flush" cache coherence instruction (90). If the current instruction is a "flush" cache coherence instruction ("YES" of 90), processor 4A may output signals 15A to cache controller 12A (92). Signals 15A instruct cache controller 12A to perform a flush cache coherence operation. After processor 4A outputs signals 15A to cache controller 12A, processor 4A increments the program counter (88). Once processor 4A has incremented the program counter, processor 4A may loop back and retrieve the instruction from the memory location indicated by the memory address stored in the program counter of processor 4A (70).

If the current instruction is not a "flush" cache coherence instruction ("NO" of 90), processor 4A may perform some other operation (94). For example, the current instruction may cause processor 4A to perform an arithmetic operation. After performing the operation, processor 4A may increment the program counter (88). Processor 4A may then loop back and retrieve the instruction from the memory location indicated by the memory address stored in the program counter of processor 4A (70).

Figure 7:
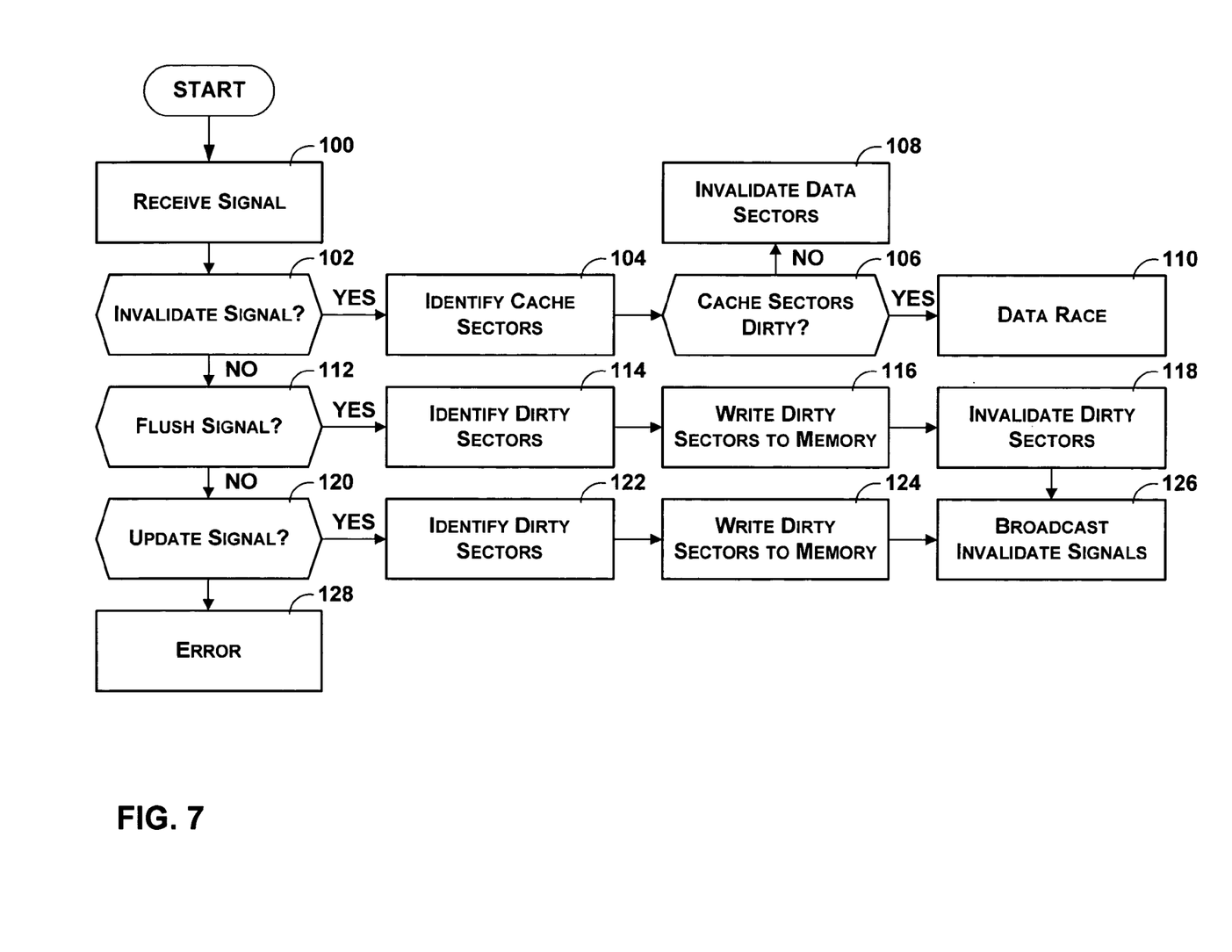
FIG. 7 is a flowchart illustrating an exemplary operation of a cache controller.

FIG. 7 is a flowchart illustrating an exemplary operation of cache controller 12A. Initially, cache controller 12A may receive signal 15A (100). When cache controller 12A receives signal 15A, cache controller 12A may determine whether signal 15A is an "invalidate" signal (102). If signal 15A is an "invalidate" signal ("YES" of 102), cache controller 12A may identify one or more cache sectors in cache 8A that are indicated by the signal (104). After identifying the cache sectors, cache controller 12A may determine whether any of the identified cache sectors are "dirty" (106). If any of the identified cache sectors are "dirty" ("YES" of 106), cache controller 12A may output a signal that indicates that cache controller 12A has detected a data race (110). Otherwise, if none of the identified cache sectors are "dirty" ("NO" of 106), cache controller 12A may invalidate the identified cache sectors (108).

When signal 15A is not an "invalidate" signal ("NO" of 102), cache controller 12A may determine whether signal 15A is a signal to perform a flush cache coherence operation (112). If signal 15A is a signal to perform an flush cache coherence operation ("YES" of 112), cache controller 12A may identify any "dirty" cache sectors of cache 8A specified by signal 15A (114). After identifying the "dirty" cache sectors, cache controller 12A may write data in the "dirty" cache sectors to shared memory 6 (116). After writing the data to shared memory 6, cache controller 12A may invalidate cache sectors in cache 6A specified by the signal (118). Cache controller 12A may then broadcast "invalidate" messages to cache controllers 12B through 12N (126). These invalidate messages may also specify memory addresses associated with the "dirty" cache sectors.

If signal 15A is not a signal to perform a flush cache coherence operation ("NO" of 112), cache controller 12A may determine whether signal 15A is a signal to perform an update cache coherence operation (120). If signal 15A is a signal to perform an update cache coherence operation ("YES" of 120), cache controller 12A may identify any "dirty" cache sectors of cache 8A specified by signal 15A (122). After identifying the "dirty" cache sectors, cache controller 12A may write the "dirty" cache sectors to shared memory 6 (124). Next, cache controller 12A may broadcast "invalidate" messages to cache controllers 12B through 12N (126).

If signal 15A is not a signal to perform an update cache coherence operation ("NO" of 120), cache controller 12A may output an error (128).

Figure 8:
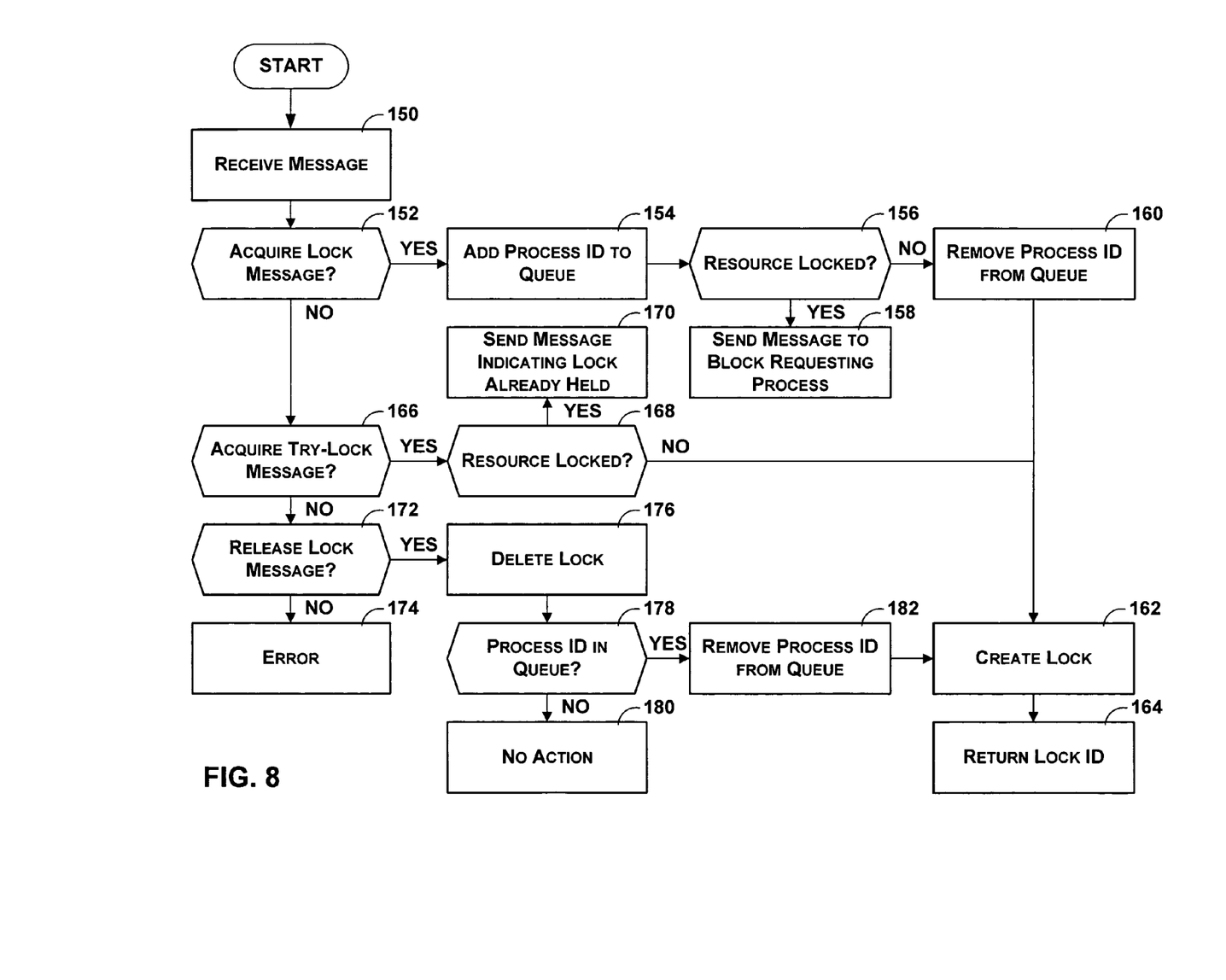
FIG. 8 is flowchart illustrating an exemplary operation of a lock manager.

FIG. 8 is flowchart illustrating an exemplary operation of lock manager 14. Initially, lock manager 14 receives a message from one of processors 4 via inter-processor bus 17 (150).

When lock manager 14 receives the message, lock manager 14 may determine whether the received message is an "acquire lock" message (152). If the received message is an "acquire lock" message ("YES" of 152), lock manager 14 may add a process identifier specified in the received message to a lock request queue (154). The process identifier may be a process identifier used within one of processors 4 concatenated with an identifier of the one of processors 4. Next, lock manager 14 may determine whether another process has already acquired a lock on a resource specified by the received message (156). For example, lock manager 14 may use lock table 9 to determine whether other processes have already acquired locks on the resource specified by the received message. As discussed above, lock table 9 may indicate whether particular resources are locked.

If lock manager 14 determines that a Process has already acquired a lock on the specified resource ("YES" of 156), lock manager 14 may generate and send a message to the one of processors 4 that generated the received message (158). The message sent by lock manager 14 may instruct the processor to block the process that requested the lock. On the other hand, if lock manager 14 determines that the specified resource is not are locked ("NO" of 156), lock manager 14 may remove the process identifier of the requesting process from the lock request queue (160). Next, lock manager 14 may create a lock for the requesting process for the specified resources (162). For example, lock manager 14 may update lock table 9 to indicate that the requesting process holds a lock on the specified resources. After creating the lock, lock manager 14 may return an identifier of the lock to the processor of the requesting process (164). When the processor receives this signal, the processor may unblock the requesting process.

If the received message is not an "acquire lock" message ("NO" of 152), lock manager 13 may determine whether the received message is a "try-lock" message (166). If the received message is a "try-lock" message ("YES" of 166), lock manager 14 may determine whether another process has already acquired a lock on the resource specified by the "try-lock" message (168). If lock manager 14 determines that another process already holds a hold on the specified resource ("YES" of 168), lock manager 14 may generate and send a message to the one of processors 4 that generated the "try-lock" message (170). The message sent by lock manager 14 may instruct the processor that another process has already acquired a lock on the resource, but the processor may allow the process that originated the "try-lock" message to continue operating. On the other hand, if lock manager 14 determines that no other resource has acquired a lock on: the specified resource ("NO" of 168), lock manager 14 may create a lock for the requesting process for the specified resource (162). After creating the lock, lock manager 14 may return an identifier of the lock to the processor of the requesting process (164).

If the received message is not an "acquire try-lock" message ("NO" of 166), lock manager 14 may determine whether the received message is a "release lock" message (172). If the received message is a "release lock" message ("YES" of 172), lock manager 14 may release the lock specified in the "release lock" message (176). For example, a "release lock" message may include a lock identifier provided by lock manager 14 when lock manager 14 created the lock. In this example, lock manager 14 may update lock table 9 to release the lock identified by the lock identifier. After lock manager 14 releases the lock, lock manager 14 may determine whether there are any process identifiers in the lock request queue that are requesting a resource associated with the released lock (178). If there is no such process identifier in the lock request queue ("NO" of 178), lock manager 14 performs no further action (180). On the other hand, if there is such a process identifier in the lock request queue ("YES" of 178), lock manager 14 may remove this process identifier from the lock request queue (182).

Next, lock manager 14 may create a lock for the process identified by the process identifier for the specified resource (162). For example, lock manager 14 may update lock table 9 to indicate that this process holds a lock on the specified resource. After creating the lock, lock manager 14 may return a message that specifies an identifier of the lock to the processor of this process (164). When the processor receives this message, the processor may unblock this process.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored as one or more instructions or code on a computer-readable medium. Computer-readable media includes computer storage media. A storage medium may be any available media that can be accessed by a computer. By way of example, and not limitation, such computer-readable media can comprise random-access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Storage media may comprise computer program products. Disk and disc, as used herein, includes compact disc (CD), laser disc, optical disc, DVD optical discs, floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
    executing a first software process on a first processor in a multi-processor computing system, wherein the first software process comprises a sequence of instructions that includes a process synchronization kernel call instruction;
    executing a first operating system (OS) instance on the first processor;
    executing a process synchronization kernel service of the first OS instance with respect to a resource associated with one or more memory locations of a shared memory when the first processor executes the process synchronization kernel call instruction,
    wherein the process synchronization kernel service comprises a sequence of instructions that includes a cache coherence instruction,
    wherein the shared memory is shared among the first processor and at least one other processor in the multi-processor computing system; and
    executing, with the first processor, the cache coherence instruction that is included in the sequence of instructions of the process synchronization kernel service,
    wherein when the first processor executes the cache coherence instruction, the first processor outputs signals to processors in the multi-processor computing system other than the first processor, wherein the signals enforce cache coherence among caches associated with the processors in the multi-processor computing system other than the first processor with respect to the one or more memory locations associated with the resource.

2. The method of claim 1, wherein the method further comprises:
    executing, with the first processor, instructions of a lock kernel service of the first OS instance with respect to the resource when the first processor executes a process synchronization kernel call instruction in the first software process with respect to the resource,
    wherein, when executed, instructions of the lock kernel service cause the first processor to acquire a lock on the resource for the first software process, and
    wherein, when the first processor acquires the lock on the resource for the first software process, other software processes operating within the multi-processor computing system are prevented from reading data from the memory locations associated with the resource or writing data to the memory locations associated with the resource.

3. The method of claim 2, wherein executing the instructions of the lock kernel service comprises sending one or more messages to a central lock manager that, in response to the messages, determines whether a process has already acquired a lock on the resource and creates the lock on the resource for the first software process when no other process holds a lock on the resource.

4. The method of claim 2, wherein executing instructions of the lock kernel service comprises blocking the first software process when another software process already holds a lock on the resource.

5. The method of claim 2,
    wherein a first cache is associated with the first processor;
    wherein the first cache includes a cache sector that is associated with one or more of the memory locations associated with the resource; and
    wherein executing the first software process comprises executing, with the first processor, one or more instruction of the first software process that cause the first processor to initiate, after acquiring the lock on the resource, a write operation that writes updated data to the cache sector.

6. The method of claim 1,
    wherein executing a process synchronization kernel service comprises executing an unlock kernel service,
    wherein the unlock kernel service comprises the sequence of instructions that includes the cache coherence instruction and instructions that cause a lock on the resource to be released.

7. The method of claim 6,
    wherein executing the unlock kernel service comprises executing one or more instructions that cause the first processor to send a communication to a central lock manager; and
    wherein the method further comprises releasing, with the lock manager, the lock on the resource.

8. The method of claim 7, wherein the method further comprises:
    determining, with the lock manager, whether a second process has requested a lock on the resource; and
    creating, with the lock manager, a lock on the resource for the second process when the second process has requested a lock on the resource.

9. The method of claim 1,
    wherein a first cache is associated with the first processor;

wherein the first cache includes a first cache sector that is associated with a set of memory locations that include one or more of the memory locations associated with the resource; and wherein executing, with the first processor, the cache coherence instruction comprises outputting one or more signals that cause data in the first cache sector to be copied to memory locations in the memory and outputting one or more signals to the processors in the multi-processor computing system other than the first processor, wherein the one or more signals outputted to the other processors in the multi-processor system cause caches associated with the other processors in the multi-processor system to invalidate cache sectors of these caches that are associated with the set of memory locations.

10. The method of claim 9, wherein outputting one or more signals comprises outputting one or more signals that cause the first cache sector to be invalidated after data in the first cache sector is copied to the memory locations in the shared memory.

11. The method of claim 9, wherein the method further comprises:

receiving the one or more signals with a first cache controller associated with first cache; and sending, with the first cache controller, invalidate messages to cache controllers associated with other caches in the multi-processor system, and wherein the invalidate messages instruct these cache controllers to invalidate in the other caches cache sectors associated with the set of memory locations.

12. The method of claim 11, wherein a second cache controller is associated with a second cache;

wherein the second cache includes a second cache sector that is associated with the set of memory locations; and wherein the method further comprises detecting a data race when the second cache controller receives an invalidate message that instructs the second cache controller to invalidate the second cache sector and the second cache sector stores data that is different than data stored in the shared memory at the set of memory locations.

13. The method of claim 1, wherein the first processor comprises hardware to implement instructions of an instruction set, wherein the instruction set include the cache coherence instruction.

14. The method of claim 1, wherein the caches cache data that respective processors in the multi-processor computing system have read from the memory and data that the respective processors have written to the memory.

15. The method of claim 1, wherein the instructions of the first software process do not include the cache coherence instruction.

16. The method of claim 1, wherein executing the first software process comprises executing the instructions of the first software process as one process of a multi-process software application; and wherein instructions of another process of the multi-process software application execute on a second processor in the multi-processor computing system.

17. The method of claim 16, wherein the method further comprises detecting a network attack with the multi-process software application.

18. A multi-processor computing system comprising:
a first processor that executes a first operating system (OS) instance and that executes a first software process;
a second processor that executes a second OS instance;
a shared memory having memory locations that store data, wherein the shared memory is utilized by the first processor and the second processor;
a first cache that stores data that the first processor has read from the memory and data that the first processor has written to the shared memory; and
a second cache that stores data that the second processor has read from the memory and data that the second processor has written to the shared memory;
wherein the first processor includes hardware to execute cache coherence instructions,
wherein when the first processor executes a process synchronization kernel call instruction in the first software process, the first processor executes instructions of a process synchronization kernel service of the first OS instance with respect to a resource associated with one or more memory locations of the shared memory, and
wherein when the first processor executes a cache coherence instruction in the process synchronization kernel service, the first processor outputs signals to the second processor, wherein the signals enforce cache coherence among the first cache and the second cache with respect to the one or more memory locations associated with the resource.

19. The multi-processor computing system of claim 18,
wherein the first processor executes instructions of a lock kernel service of the first OS instance with respect to the resource when the first processor executes a process synchronization kernel call instruction in the first software process with respect to the resource,
wherein, when the first process executes the instructions of the lock kernel service, the instructions of the lock kernel service cause the first processor to acquire a lock on the resource for the first software process; and
wherein when the first processor acquires the lock on the resource for the first software process, other software processes operating within the multi-processor computing system are prevented from reading data from the memory locations associated with the resource or writing data to the memory locations associated with the resource.

20. The multi-processor computing system of claim 19,
wherein the multi-processor computing system comprises a central lock manager that manages locks on resources;
wherein, when the first processor executes the instructions of the lock kernel service, the instructions of the lock kernel service cause the first processor to issue a message to the lock manager, and
wherein, when the lock manager receives the message, the lock manager determines whether a process has already acquired a lock on the resource and creates the lock on the resource for the first software process when no other process has acquired a lock on the resource.

21. The multi-processor computing system of claim 19, wherein the instructions of the lock kernel service cause the first processor to block the first software process when another software process has already acquired a lock on the resource.

22. The multi-processor computing system of claim 19,
wherein the first cache comprises a cache sector that is associated with one or more of the memory locations associated with the resource; and
wherein, after acquiring the lock on the resource, the instructions of the first software process cause the first processor to initiate a write operation that writes updated data to the cache sector.

23. The multi-processor computing system of claim 18, wherein the instructions of the process synchronization kernel service include the cache coherence instruction and instructions that cause a lock on the resource to be released.

24. The multi-processor computing system of claim 23,
wherein the multi-processor computing system comprises a central lock manager that manages locks on resources,
wherein the instructions of the unlock kernel service cause the first processor to send one or more messages to the lock manager,
wherein the lock manager responds to the messages by releasing the lock on the resource.

25. The multi-processor computing system of claim 24, wherein the lock manager further responds to the messages by determining whether a second software process has requested a lock on the resource and by creating a lock on the resource for the second software process when the second software process has requested a lock on the resource.

26. The multi-processor computing system of claim 18, wherein the first cache comprises:
a first cache sector that is associated with a set of memory locations that include one or more of the memory locations associated with the resource; and
a first cache controller; and
wherein when the first processor executes the cache coherence instruction, the first processor outputs one or more signals to the first cache controller,
wherein, when the first cache controller receives the signals, the first cache controller causes data in the first cache sector to be copied to memory locations in the shared memory and causes the first processor to output one or more signals to processors in the multi-processor system other than the first processor, wherein the one or more signals outputted to the other processors in the multi-processor system cause cache controllers in caches associated with the other processors in the multi-processor system to invalidate cache sectors of these caches that are associated with the set of memory locations.

27. The multi-processor computing system of claim 26, wherein when the first processor outputs the one or more signals, the first cache controller invalidates the first cache sector after data in the first cache sector is copied to the memory locations in the shared memory.

28. The multi-processor computing system of claim 26,
wherein the second cache comprises a second cache controller; and
wherein the first cache controller sends a message to the second cache controller that instructs the second cache controller to invalidate any cache sectors in the second cache that are associated with the set of memory locations.

29. The multi-processor computing system of claim 28,
wherein the second cache includes a second cache sector that is associated with the set of memory locations; and
wherein the second cache controller detects a data race when the second cache controller receives an invalidate message that instructs the second cache controller to invalidate the second cache sector and the second cache sector stores data that is different than data stored in the shared memory at the set of memory locations.

30. The multi-processor computing system of claim 18, wherein the first processor comprises hardware to implement instructions of an instruction set that includes the cache coherence instruction.

31. The multi-processor computing system of claim 18, wherein the instructions of the first software process do not include the cache coherence instruction.

32. The multi-processor computing system of claim 18,
wherein the first software process is one process of a multi-process software application; and
wherein the second processor executes a second software process of the multi-process software application.

33. The multi-processor computing system of claim 32, wherein the multi-process software application detects a network attack within network traffic flowing to the multi-processor computing system.

34. A computer-readable storage medium comprising instructions that, when executed, cause a first processor of a multi-processor computing system to:
execute instructions of a first software process on a first processor in a multi-processor computing system, wherein the first software process comprises a sequence of instructions that includes a process synchronization kernel call instruction;
execute a first operating system (OS) instance on the first processor;
execute a process synchronization kernel service of the first OS instance with respect to a resource that is associated with one or more memory locations of a shared memory when the first processor executes the process synchronization kernel call instruction,
wherein the process synchronization kernel service comprises a sequence of instructions that includes a cache coherence instruction,
wherein the shared memory is shared among the first processor and at least one other processor in the multi-processor computing system; and
execute the cache coherence instruction that is included in the sequence of instructions of the process synchronization kernel service,
wherein when the first processor executes the cache coherence instruction, the first processor outputs signals to processors in the multi-processor computing system other than the first processor, wherein the signals enforce cache coherence among caches associated with processors in the multi-processor computing system other than the first processor with respect to the memory locations associated with the resource.

35. The computer-readable storage medium of claim 34, wherein the instructions further cause the first processor to:
execute instructions of a lock kernel service of the first OS instance with respect to the resource when the first processor executes a process synchronization kernel call instruction in the first software process with respect to the resource,
wherein, when executed, instructions of the lock kernel service cause the first processor to acquire a lock on the resource for the first software process, and
wherein, when the first processor acquires the lock on the resource for the first software process, other software processes operating within the multi-processor computing system are prevented from reading data from the memory locations associated with the resource or writing data to the memory locations associated with the resource.

36. The computer-readable storage medium of claim 34, wherein the instructions cause the first processor to execute a process synchronization subroutine at least in part by causing the first processor to execute instructions of an unlock kernel service, wherein the instructions of the unlock kernel service comprises the sequence of instructions that includes the cache coherence instruction and instructions that cause a lock on the resource to be released.

37. The computer-readable storage medium of claim 34, wherein a first cache is associated with the first processor; wherein the first cache includes a first cache sector that is associated a set of memory locations that include one or more of the memory locations associated with the resource, wherein the cache coherence instruction causes the first processor to output one or more signals that cause data in the first cache sector to be copied to memory locations in the memory and output one or more signals to the processors in the multi-processor computing system other than the first processor, wherein the one or more signals outputted to the other processors in the multi-processor system cause caches associated with the other processors in the multi-processor system to invalidate cache sectors of these caches that are associated with the set of memory locations.

* * * * *